United States Patent
Pan

(10) Patent No.: US 8,242,660 B2
(45) Date of Patent: Aug. 14, 2012

(54) AC GENERATOR

(75) Inventor: Te-Pei Pan, Taipei (TW)

(73) Assignee: G+ Powertec Ltd., Kowloon (HK)

( * ) Notice: Subject to any disclaimer, the term of this patent is extended or adjusted under 35 U.S.C. 154(b) by 387 days.

(21) Appl. No.: 12/619,363

(22) Filed: Nov. 16, 2009

(65) Prior Publication Data

US 2011/0115327 A1    May 19, 2011

(51) Int. Cl.
*H02K 1/22* (2006.01)
(52) U.S. Cl. .................. 310/268; 310/216.001
(58) Field of Classification Search ........ 310/216.001–216.134, 266, 268, 310/190
See application file for complete search history.

(56) References Cited

U.S. PATENT DOCUMENTS

| 5,751,075 A * | 5/1998 | Kwon et al. ............... 310/12.24 |
| 7,288,862 B2 * | 10/2007 | Song et al. ....................... 310/15 |
| 2010/0007230 A1 * | 1/2010 | Suzuki et al. .................... 310/90 |
| 2010/0225195 A1 * | 9/2010 | Asano et al. ........... 310/216.067 |

* cited by examiner

*Primary Examiner* — Nguyen N Hanh
(74) *Attorney, Agent, or Firm* — Byrne Poh LLP

(57) ABSTRACT

AC generators are disclosed. Example generators may include a tubular air core, with high magnetic permeability and with a first and second end, the air core having a plurality of eddy current reducing slits passing from a radially outer surface of the air core to a radially inner surface of the air core; and a continuous coil made of conducting wire having a plurality of loops wrapped around the air core, the coil positioned between the first end and the second end of the air core.

27 Claims, 9 Drawing Sheets

AC GENERATOR

BACKGROUND

Example embodiments of the present invention relate to generators used in the generation of electricity. In particular, example embodiments relate to AC generators designed to convert rotational kinetic energy into electrical energy.

AC generators are used in many applications, including, for example, power generation by electrical utilities. In addition, AC generators find many smaller scale applications in, e.g., consumer devices, automobiles, etc. Many currently generator designs are, however, not well-suited for uses in these smaller-scale applications. For example, currently designs are often bulky and heavy, using significant quantities of conductive and ferromagnetic metals (which are dense, increasing the overall weight of the generator) as shielding and housing materials. In addition, in order to maintain efficiency in the generation of electricity, such materials are also used in solid, or essentially solid, e.g. laminated, cores, again adding weight and bulk to the generator. Further, these materials are often comparatively expensive, adding to the expense of constructing the generator.

SUMMARY

Accordingly, example embodiments of the present invention provide an AC generator design which is capable of efficiently converting rotation energy into electrical energy, without the need for heavy and expensive shielding and core materials. In particular, example embodiments of the present invention may provide an air core which may be light weight and easily manufactured, while being structured to provide self-shielding properties, to facilitate an efficient generation process, e.g., with minimal losses due to induced eddy currents, etc. Such example embodiments may be suitable for use in smaller applications, e.g., power washers and other hand-held devices, and may also be manufactured for large scale applications.

Example embodiments of the present invention provide an air core for a generator, which may include a tubular air core, with high magnetic permeability and with a first and second end, the air core having a plurality of eddy current reducing slits passing from a radially outer surface of the air core to a radially inner surface of the air core; and a continuous coil made of conducting wire having a plurality of loops wrapped around the air core, the coil positioned between the first end and the second end of the air core.

In some example embodiments, the slits may extend from the first end of the air core towards the second end, in the direction of the longitudinal axis of the air core. Further, the slits may extend substantially the axial length of the coil.

Example air cores may also include a plurality of second slits passing from the outer surface of the air core to the inner surface of the air core, the second slits extending from the second end of the air core towards the first end of the air core, in the direction of the longitudinal axis of the air core.

Example air cores may also include a flange having a high magnetic permeability and extending radially outward from the air core, located between the first end and the second end of the air core. In some embodiments the radius of the flange may be at least as large as the radius of the coil.

Further, some example embodiments may also include a tubular bobbin; where the coil may be wrapped around the bobbin; and the air core passes longitudinally through the bobbin and the coil.

Other example embodiments may provide generators, including at least one air core such as those described above. Such generators may also include a rotor mounted for rotation about an axis of rotation, including a flat shaped rotor body having at least a first side normal to the axis of rotation, and a plurality of permanent magnets attached to the rotor, having magnetic poles oriented parallel to the axis of rotation; where the air core is positioned relative to the first side of the rotor body such that at least one permanent magnet passes adjacent to the coil when the rotor rotates. In some example generators, the air core may be positioned such that the magnetic poles of the permanent magnets are aligned substantially normal to the planes of the loops of the coil.

In example generators, the permanent magnets may be arranged evenly in a ring, with each permanent magnet placed equidistant from the axis of rotation. In such embodiments, the permanent magnets may be arranged with alternating magnetic pole orientations.

Such example embodiments may also include a plurality of air cores; wherein the air cores are arranged evenly in a ring adjacent to the first side of the rotor body, the air cores each being the same distance from the axis of rotation of the rotor as the permanent magnets. The quantity of air cores may be the same as the quantity of permanent magnets.

Other example embodiments may also include a plurality of second air cores; where the second air cores are arranged evenly in a ring adjacent to the second side of the rotor body, the air cores each being the same distance from the axis of rotation of the rotor as the permanent magnets. Again, the quantity of second air cores may be the same as the quantity of permanent magnets.

Some example embodiments may include a non-magnetic housing; where the rotor and the air core are mounted to the housing.

In some example generators, at least two of the coils may be connected together in series, and in some example generators at least two of the coils may be connected together in parallel. Example generators may also include an output device connected to one or more of the coils; where the output device conforms an EMF induced in the coils to a desired frequency and/or amplitude. In such embodiments, the output device may include a digital controller.

Some example generators may also include a second rotor mounted for rotation about the axis of rotation of the rotor and including a plurality of second permanent magnets.

In addition, some example generators further include an output device connected to the coils; wherein the output device produces a single-phase output from the EMF induced in the coils. And in some example generators, the output device produces a multi-phase output from the EMF induced in the coils.

Further some example embodiments may provide a generator including a concentration element for concentrating a magnetic field having a hollow core and at least one eddy current reducing slit passing from an outer surface to an inner surface; a conduction element for receiving an induced electromotive force encircling the concentration element; a rotation element mounted for rotation about an axis of rotation; and a plurality of field generation elements for creating a magnetic field attached to the rotation element; where the concentration element is positioned relative to the rotation element such that at least one field generation element passes adjacent to the conduction element when the rotation element rotates around the axis of rotation.

Also, some example embodiments provide a method of generating an electrical signal, including producing a changing magnetic field; concentrating the magnetic field with a hollow air core having at least one eddy current reducing slit passing from an outer surface to an inner surface; receiving an induced electromotive force in a conductor encircling the air core; conditioning the induced electromotive force into an output signal using an output device; and providing the output signal.

BRIEF DESCRIPTION OF THE DRAWINGS

The present invention will be more readily understood from a detailed description of example embodiments taken in conjunction with the following figures.

DETAILED DESCRIPTION OF EXAMPLE EMBODIMENTS

Some example embodiments of the present invention provide AC generators which include one or more permanent magnets arranged on a rotor and one or more stator elements including coils in which an electromotive force (EMF) is induced during operation. Such example embodiments provide a number of advantages over traditional AC generator designs. For instance, in example embodiments, the stator elements are constructed with an air core design which allows for efficient electrical generation, e.g. minimizing eddy currents, etc., and also allows for the use of lightweight housing materials, as the cores themselves provide inherent shielding. In addition, example embodiments provide a digital controller to condition the generator's output, providing an output with stable characteristics, even when the generator is turned at a non-constant rate, thus eliminating the need for complicated physical transmissions. As a result, example embodiments of the present invention are able to provide compact and lightweight generators cost effectively, while maintaining efficiency and reliability.

Figure 1:
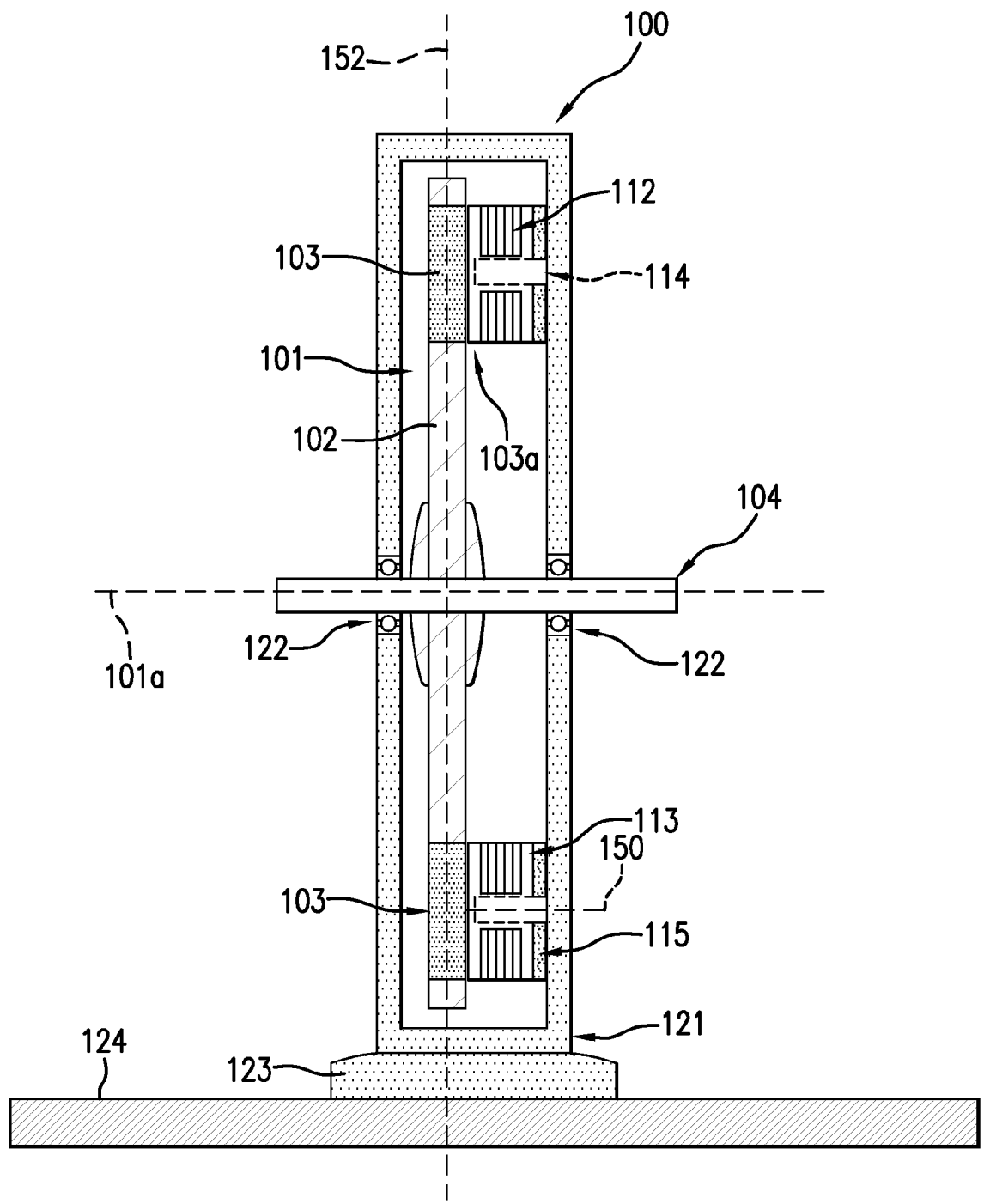
FIG. 1 illustrates an example generator in accordance with one embodiment of the present invention.

An AC generator 100 according to a first example embodiment of the present invention is illustrated in FIG. 1. The generator 100 includes a rotor 101. The rotor 101 may be shaped substantially in the form of a disk or wheel, and may be designed to rotate in the plane of the disk, about an axis of rotation 101a, relative to the other components of the generator 100.

Figure 2:
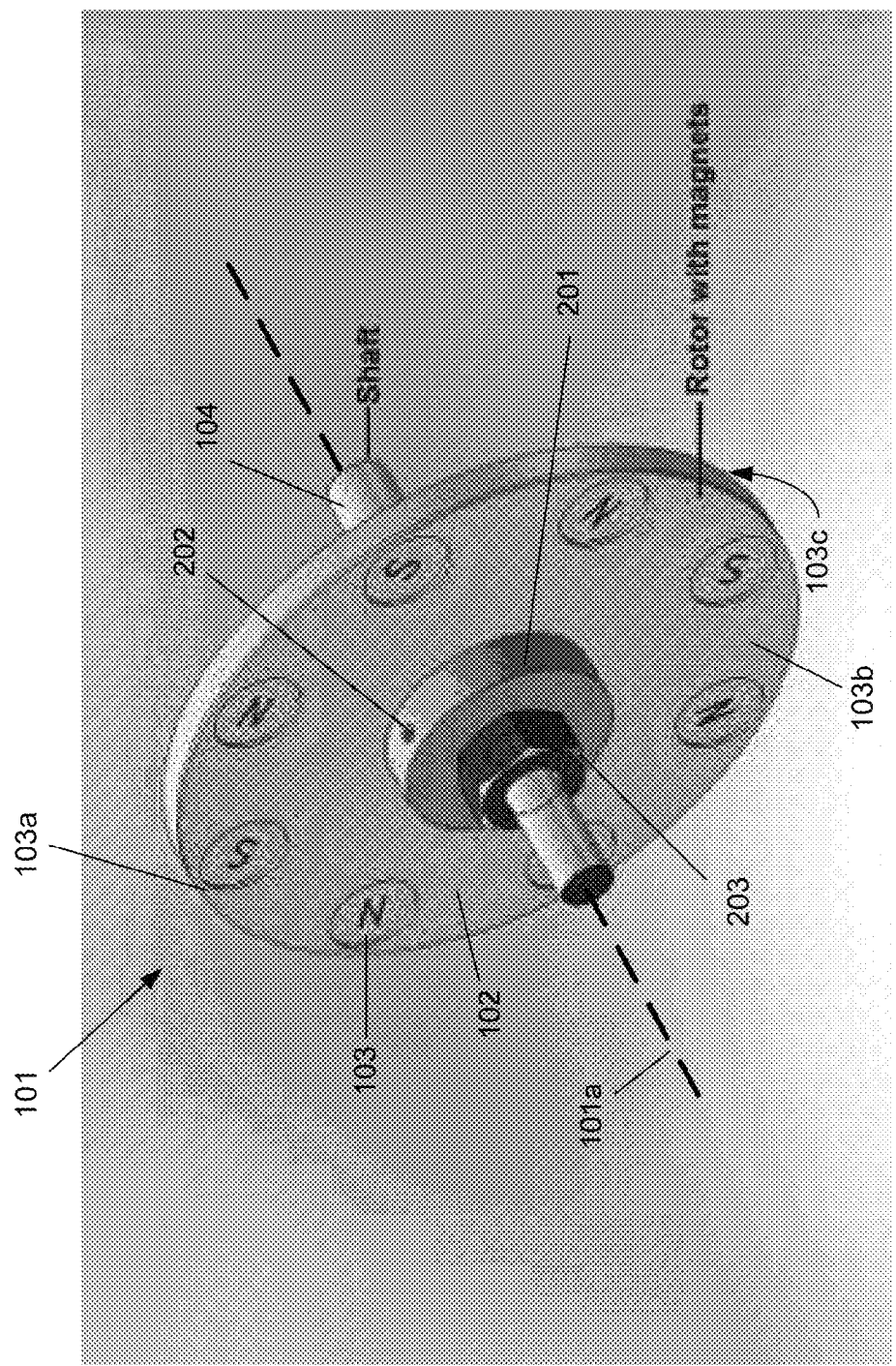
FIG. 2 illustrates an example rotor in accordance with one embodiment of the present invention.

FIG. 2 illustrates an example rotor 101 in detail. As shown, the rotor 101 may include a rotor body 102 shaped generally as a disk. Attached to the rotor body 102 may be a plurality of permanent magnets 103. The illustrated rotor 101 of FIG. 2 may have a number of apertures 103a which pass through the rotor body 102 (the illustrated rotor is depicted with eight apertures). Inserted into each aperture 103a in the illustrated embodiment is a permanent magnet 103. The permanent magnets 103 may be of any suitable kind, e.g. neodymium-iron-boron or samarium-cobalt magnets, or permanent magnets made from any other ferro- or ferrimagnetic material. In some examples, each of the permanent magnets 103 used may produce a similar magnetic field to every other magnet 103, for example, by having the same size, shape, composition, etc., as every other magnet 103. The magnets 103 may have any suitable shape. For example the magnets 103 may be disk shaped or may be substantially rectangular, or trapezoidal, etc. It is noted that, in the following description, example generators 100 are described as having magnets 103 positioned on a rotor 101, and coils 112 positioned on stator elements 111. However, in other example embodiments, the positions of the elements may be reversed, resulting in stator magnets and coils on the rotor.

The permanent magnets 103 may be affixed within the apertures 103a formed in the rotor body 102, passing from one side 103b of the rotor body 102 to the other side 103c. The illustrated magnets 103 may be evenly spaced in a ring centered around the axis of rotation 101a of the rotor 101. The illustrated magnets 103 are arranged such that the north and south poles of each magnet 103 are oriented perpendicular to the plane of the rotor 101; accordingly the north pole of each magnet 103 faces perpendicularly away from one side of the rotor 101 while the south side faces away from the other side. The poles of the illustrated magnets 103 are arranged in an alternating configuration. For instance, as illustrated, if a magnet 103 is arranged such that its north pole faces away from a first surface of the rotor 101, then the magnets 103 adjacent to it will be arranged so that their south poles face out of the same surface. As a result, a similar alternating pattern will naturally occur when viewing the opposite surface of the rotor 101. In addition, in order to attain such a circular pattern, an even number of permanent magnets 103 is used.

In other examples, however, different orientations may be used. For example, the magnets 103 may be aligned along an edge of the rotor 101 with the poles aligned radially outward from the axis of rotation 101a. In other embodiments, the alignments of the poles need not alternate for each individual magnet 103. For instance, the pole orientation may switch every two magnets 103, etc. In addition, a magnet 103 need not be an individual piece. Rather, some embodiments may use groups of magnets 103. In addition, the permanent magnets 103 need not be disk shaped. In some embodiments, the magnets 103 may not all be aligned near the outer edge of the rotor body 102, as depicted. For example, some embodiments may employ multiple rings of magnets 103, e.g., an inner ring and an outer ring. Any other reasonable configuration may be used.

The illustrated rotor 101 is formed to accommodate a shaft 104 passing through the rotor 101 along its axis of rotation 101a. The shaft 104 is integrally secured to the rotor body 102 to rotate the rotor 101. The shaft 104 may be attached to the rotor 101 in any reasonable way. For example, the shaft 104 may be formed as an integral part of the rotor 101, welded to the rotor 101, or, as illustrated, the shaft 104 may pass through an aperture in the rotor 101 and may be fixed to the rotor 101 with hardware. For instance, the shaft 104 may be pass through a collar 201 formed on the rotor body 102 and be locked in place with one or more set screws 202. In addition, the shaft 104 may be threaded and may be locked in place with nuts 203. The rotor 101 should be balanced to rotate smoothly at a high rate when a torque is applied to the shaft 104.

Returning to FIG. 1, the rotor assembly may be fitted inside a housing 121. For instance, the housing 121 may be of any suitable shape, and may have an internal cavity large enough for the rotor 101 to fit within it, while being able to rotate freely. For example, as shown in the figure, the housing 121 may have a substantially rectangular cross section, having two sides, through which the shaft 104 may pass. The two sides may, for example, be in the shape of a disk, rectangle, etc, and may each include an aperture shaped to allow the shaft 104 to pass through the housing 121, and support the rotor 101 within the housing. Inside the apertures may be bearings 122, structured to allow the shaft 104 to rotate stably with a minimum of friction.

The housing 121 will be prevented from rotating during operation, and may, accordingly, be fixed in position using any reasonable structure. For example, as shown in the illustration, the housing 121 includes a base 123, which may rest on a surface 124. Alternatively, the housing 121 may have mounting points, which may be affixed to a non-rotating structure, e.g. the body of a machine in which the generator 100 is used.

As will be explained in more detail below, because of the construction of the stator elements 111 employed in example embodiments of the present invention, the housing 121 need not be made of any special material. Rather, the housing 121 may be constructed of any material of suitable strength, weight, or other physical properties. For example, in some example embodiments, the housing 121 may be constructed of aluminum, iron, plastics, etc. It will be noted that some of these materials are not ferromagnetic, and do not provide significant shielding of electromagnetic energy.

It is noted that other example embodiments need not provide a housing 121. Such embodiments may simply provide a frame or other structure which may support the stator elements 111, described below, holding them in stable positions relative to the rotating rotor 101. In addition, any housing 121 that is provided need not be entirely closed. Further, the housing 121 may incorporate other features typically used in generators 100. For example, the housing 121 may incorporate a cooling system, a maintenance panel, etc.

The housing 121 may also provide mounting points for each of a plurality of spaced-apart stator elements 111. For instance, in one embodiment, the housing 121 may provide mounting points on a side of the housing 121 which is positioned parallel to, but spaced apart from, the plane of the rotor 101, as illustrated in FIG. 1 for two stator elements 111. Mounting points for any number of stator elements 111 may be provided. For instance, the number of mounting points provided may be equal to the number of permanent magnets 103 in the rotor 101, although other numbers of mounting points and stator elements 111 may also be provided. In addition, the mounting points may be positioned on the housing 121 similarly to the positioning of the permanent magnets 103 on the rotor 101, such that, when the rotor 101 rotates within the housing 121, the permanent magnets 103 pass adjacent to, but without touching, the stator elements 111 fixed to the respective mounting points. In example embodiments, the alignment may be such that, when the rotor 101 is in a position such that a magnet 103 is positioned directly over a stator element 111, each other magnet 103 is positioned directly over a respective stator element 111.

Figure 3:
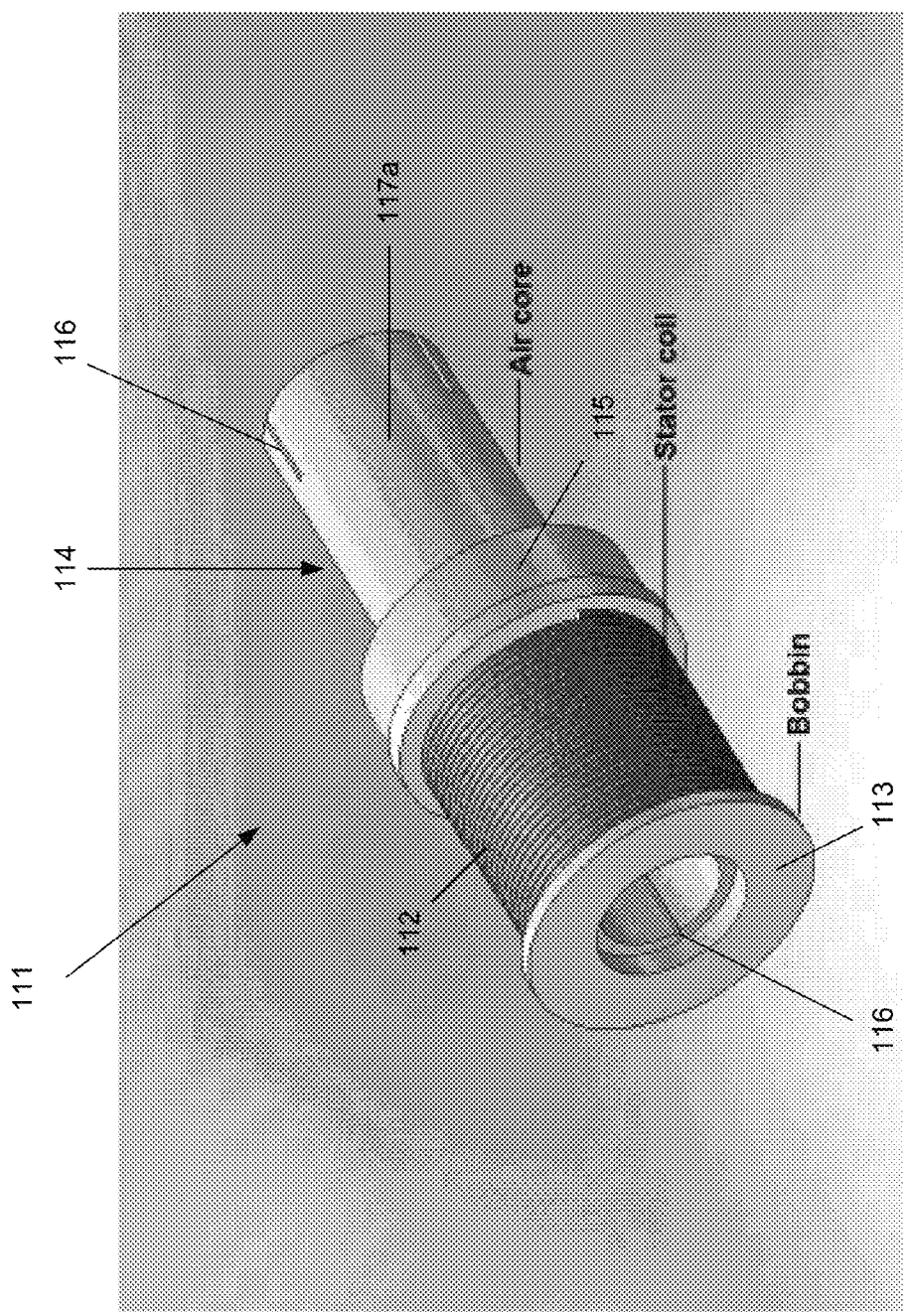
FIG. 3 illustrates an example stator element in accordance with one embodiment of the present invention.
Figure 4:
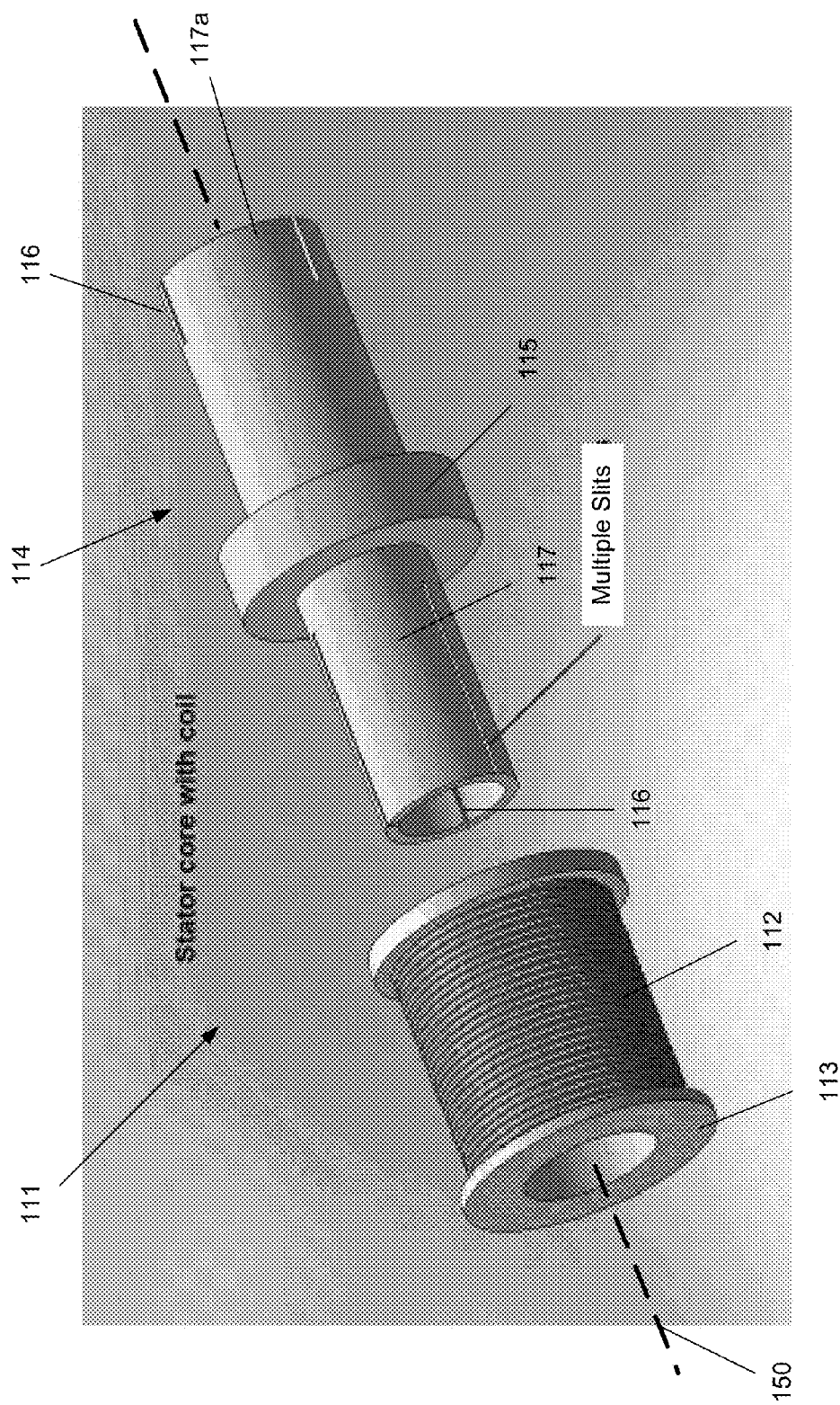
FIG. 4 illustrates one construction of the example stator element of FIG. 3, in accordance with one embodiment of the present invention.

Stator elements 111 may be affixed to the housing 121 using any appropriate structure. For instance, they may be inserted into an aperture formed in the housing 121, or may be bolted, riveted, glued, soldered, welded, to the housing 121, etc. An example stator element 111 is illustrated in FIGS. 3-4. As shown, the stator element 111 may include a coil 112. The coil 112 may be made of conducting wire wound repeatedly in a loop. Any kind of wire may be used, for example any standard wire used in the coils of traditional motors and generators. The coil 112 may be formed by turning the wire around any suitable object. For instance, as illustrated, the wire may be turned around a bobbin 113, which provides a stable structure for the coil 112, maintaining its shape, or the wire may be turned directly around an air core 114, as described more fully below. The bobbin 113 may, e.g., be constructed of an insulating material and may have a cylindrical core, around which the wire may be turned, with a flange at either end, preventing the coil 112 from sliding off. In addition, the bobbin 113 may have a bore passing through it, along a longitudinal axis of the cylinder, which may be sized to fit over an air core 114, as described below. In addition, the bobbin 113 may facilitate the connection of the coil 112 to the rest of the generator 100. For instance, a flange may contain one or more holes permitting the two ends of the coil 112 wire (leads) to exit the assembly.

An air core 114 may be provided for each coil 112. As illustrated, the air core 114 may also have a generally cylindrical shape, and may have a bore running along an axis of the cylinder. The air core 114 may be made of any material with suitable magnetic and electrical properties. Preferably, the air core may be constructed of material with a high magnetic permeability, low magnetic hysteresis, and possibly high electrical resistance. Suitable materials include iron, alloys of iron, e.g. alloys employing silicon, ferrite, etc. The air core 114 may have a flange 115 extending radially outward from the cylinder and located part way along the length of the cylinder. The flange 115 may be an integral part of the air core 114, constructed of the same material as the rest of the air core 114, or may be separately formed and attached to the body of the air core 114 in any suitable way. The flange 115 may serve as a backing for the bobbin 113 and coil 112 assembly and may have a sufficient radius and thickness to both provide a stable support for the bobbin 113 and to act as shielding.

Extending away from the flange 115 in one direction, the cylinder 117 of the air core 114 may be sized to slide into the hollow core of the bobbin 113, and may extend substantially the length of the bobbin 113, alternatively the coil may be wound directly around the air core. This portion of the air core 114 may, therefore, extend through the center of the coil 112, providing a magnetic core for the coil 112. One or more slits 116 may be formed in the air core 114. For example, as shown in the figure, multiple slits 116, e.g. three slits 116, may be formed passing lengthwise along and inward from the extremities of the air core 114. These slits 116, among other functions, limit the eddy currents that are induced in the air core 114 when the generator 100 is in operation. Minimizing eddy currents is important as such currents reduce the efficiency of the generator 100.

Extending away from the flange 115 in the other direction, the cylinder 117a of the air core 114 need not be the same size or shape, etc. For example, as shown in the figure, this side of the air core 114 may also be generally cylindrical, but may have a larger radius than the bobbin 113 end of the air core 114. This end of the air core 114 may be shaped to fit into the housing 121 at a mounting point, for example sliding into and through an aperture formed in the housing 121. The housing side 117a of the air core may also be formed with slits 116, again reducing the eddy currents induced in the air core 114 when the generator 100 is in operation.

Figure 5:
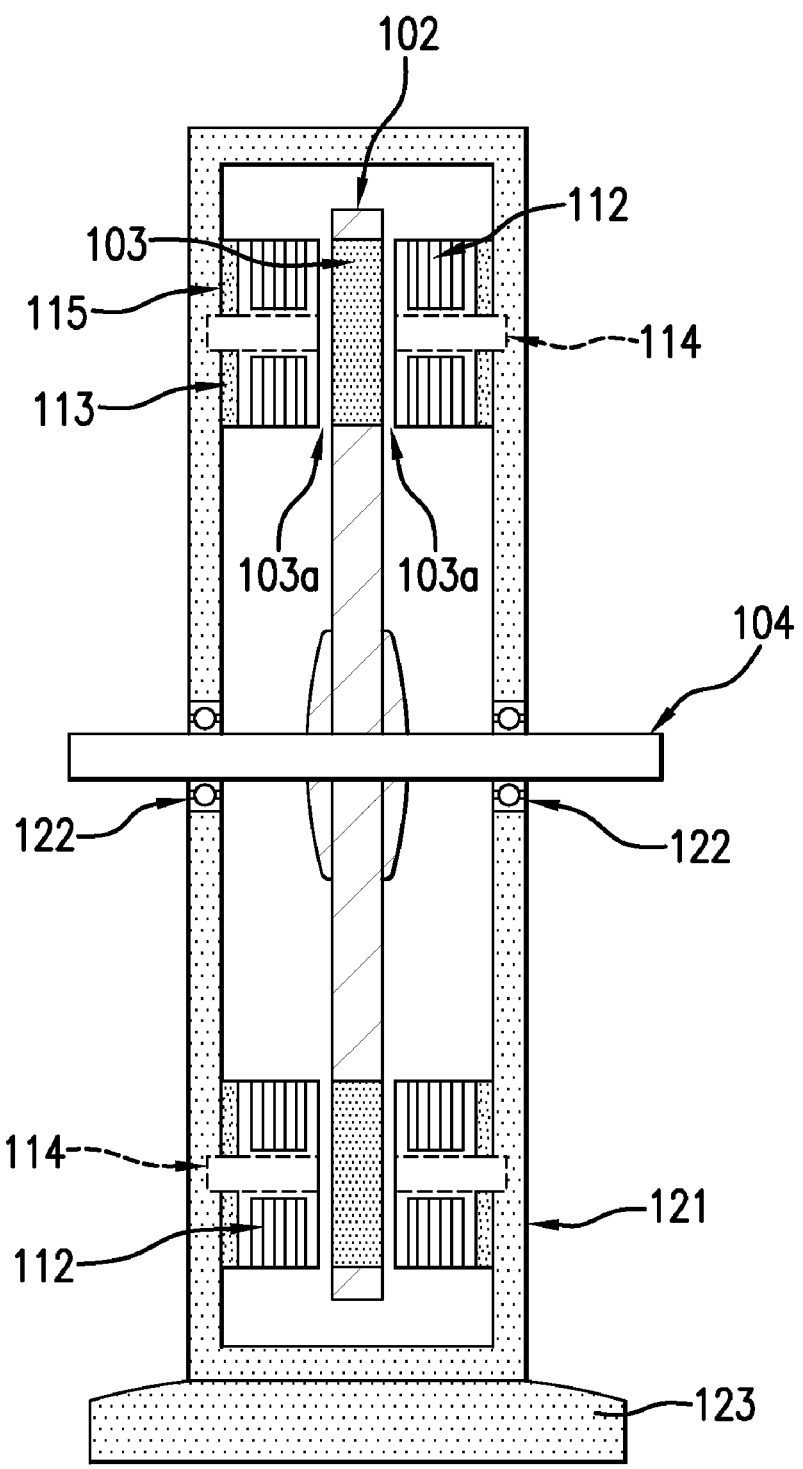
FIG. 5 illustrates an example generator in accordance with another embodiment of the present invention.

An example air core 114, can be seen installed in a generator in FIG. 1. The figure illustrates two air cores 114 in two stator elements 111. Dashed outlines of the cylinder of the air cores 114 are illustrated running longitudinally through the illustrated coils 112 and bobbins 113. As explained above, the housing end of the air cores 114 may extend into the housing 121, or may be mounted to the housing in another manner. In FIG. 1 the housing is illustrated as a solid body, accordingly it cannot be seen whether the air cores extend into the housing 121. As illustrated in FIG. 5, however, it is clear that the air cores 114 may extend into apertures in the housing 121. Also as seen in FIG. 1, the air cores 114 may include a flange 115. As illustrated, the flange 115 is depicted as a disk encircling the outlined body of the air cores 114. It is noted that, as described above, the flange 115 may be integrally formed with the air core 114, or may be a distinct piece.

By utilizing air cores 114, such as those described above, example generators 100 are able to efficiently generate electricity, while remaining economical. For instance, the air cores 114 described above utilize less material than traditional cores by employing a hollow, cylindrical design. In addition, by providing the slits 116 described above, the generation of eddy currents may be kept to a minimum, by creating physical separation between portions of the air core 114, limiting the currents that would otherwise be induced within the material of the air core 114. Reduction of eddy currents allows for more efficient generation, as such currents result in energy loss through heating of the core material. In addition, by providing flanges 115 on the air cores 114 which provide an inherent shielding effect, example generators 100 may be constructed without the need for expensive and bulky housings 121, incorporating shielding materials.

When assembled, referring to FIG. 1, the longitudinal axis 150 of each air core 114 and bobbin coil assembly may be positioned perpendicular to the plane of rotation 152 of the rotor 101. Thus, as the rotor 101 turns, the magnets 103 may pass over the end of the bobbin 113. Therefore, when the rotor 101 is turning, the magnetic flux passing through the coil 112 will be continuously changing, inducing an electromotive force (EMF) in the coil 112. Because the magnets 103 are arranged around the rotor with alternating magnetic poles, the induced EMF will also be alternating. For example, if the rotor 101 is initially rotating with a certain angular velocity as a first magnet 103 passes over a coil 112 an EMF is induced in the coil 112 in a first direction; and when the next magnet 103, the poles of which are oriented opposite to the first magnet 103, passes over the coil 112 an EMF is induced in the opposite direction. Thus, the EMF is constantly changing.

As mentioned above, in some embodiments, the design of the rotor 101 may be substantially symmetric, in that the magnets 103 may be evenly spaced in a ring, may create similar magnetic fields, etc. In such symmetric examples, the EMF induced in a coil 112, at a given rate of rotation, will be approximately sinusoidal, changing direction as the effect of the magnetic field of each successive magnet 103 becomes dominant as to that coil 112. As will be discussed further below, it is noted that the rate at which the induced EMF varies, i.e. its frequency, is dependent on the angular velocity of the rotor 101, the number of magnets 103 on the rotor 101, etc, and may not be a standard frequency commonly used in AC power systems, and may not even be constant. This induced EMF may be provided, for example, to an output device to which the leads of the coil(s) may be connected, e.g. the digital controller described more fully below.

As explained, example embodiments may include multiple stator elements 111. For instance, an embodiment may include one stator element 111 for each magnet 103, arranged in a ring facing one side of the rotor 101, as illustrated in FIG. 1. In such embodiments, a changing EMF will be induced in each of the coils 112 as the rotor 101 turns. Again, if the rotor 101 and the stator assemblies 111 are constructed and arranged symmetrically, the EMF induced in each coil 112 may have similar properties, e.g. may vary with the same frequency. In such embodiments, the coils 112 may be connected together in series, either as arranged or in any other order. In this way, the induced EMF in each coil 112 is added to that simultaneously induced in the other coils 112, increasing the power output of the generator 100. Here is it noted that the coils 112 must be connected together so that the EMF induced in each coil 112 is in phase with each other coil 112 to which it is connected, i.e. the leads of the coils 112 must be connected in an appropriate order. In such embodiments, the connected stator coils 112 will terminate in two output leads which may be connected to the output system.

In some example embodiments, stator elements 111 may be provided on both sides of the rotor 101, as shown in FIG. 5. In such cases, an air core 114, bobbin 113, coil 112, etc, may be provided directly across from each stator assembly 111 on the first side of the rotor 101. Thus the rotor 101 will rotate between two sets of stator assemblies 111, and as each magnet 103 passes over a stator element 111 on one side of the rotor 101, it will also pass over a stator element 111 on the opposite side of the rotor 101. Thus both the north and south poles of each magnet 103 may pass over stator coils 112.

This second set of stator coils 112 may also be connected in series with both each other and the stator coils 112 on the opposite side of the rotor 101, further increasing the power generated by the generator 100. It will be noted that, if symmetry is maintained, e.g. the coils have the same construction, the stator assemblies 111 are arranged in a similar configuration, etc., then the EMF induced in the second set of coils 112 will have the same frequency, etc., as the EMF induced in the first set of coils 112. It is noted here, that each of the stator elements 111 need not be connected in series. For instance, the coils 112 on each side of the rotor 101 may be connected together in series, but the two assemblies so made may be connected together in parallel. Any suitable combination of connections may be used, based on the desired output. In addition, the leads of each coil 112 need not be directly connected. Rather, the generator 100 may provide any suitable connection structure. For example, the leads of a coil may connect to a connector element, a bus, a circuit board, etc., which may facilitate the connections.

Figure 6:
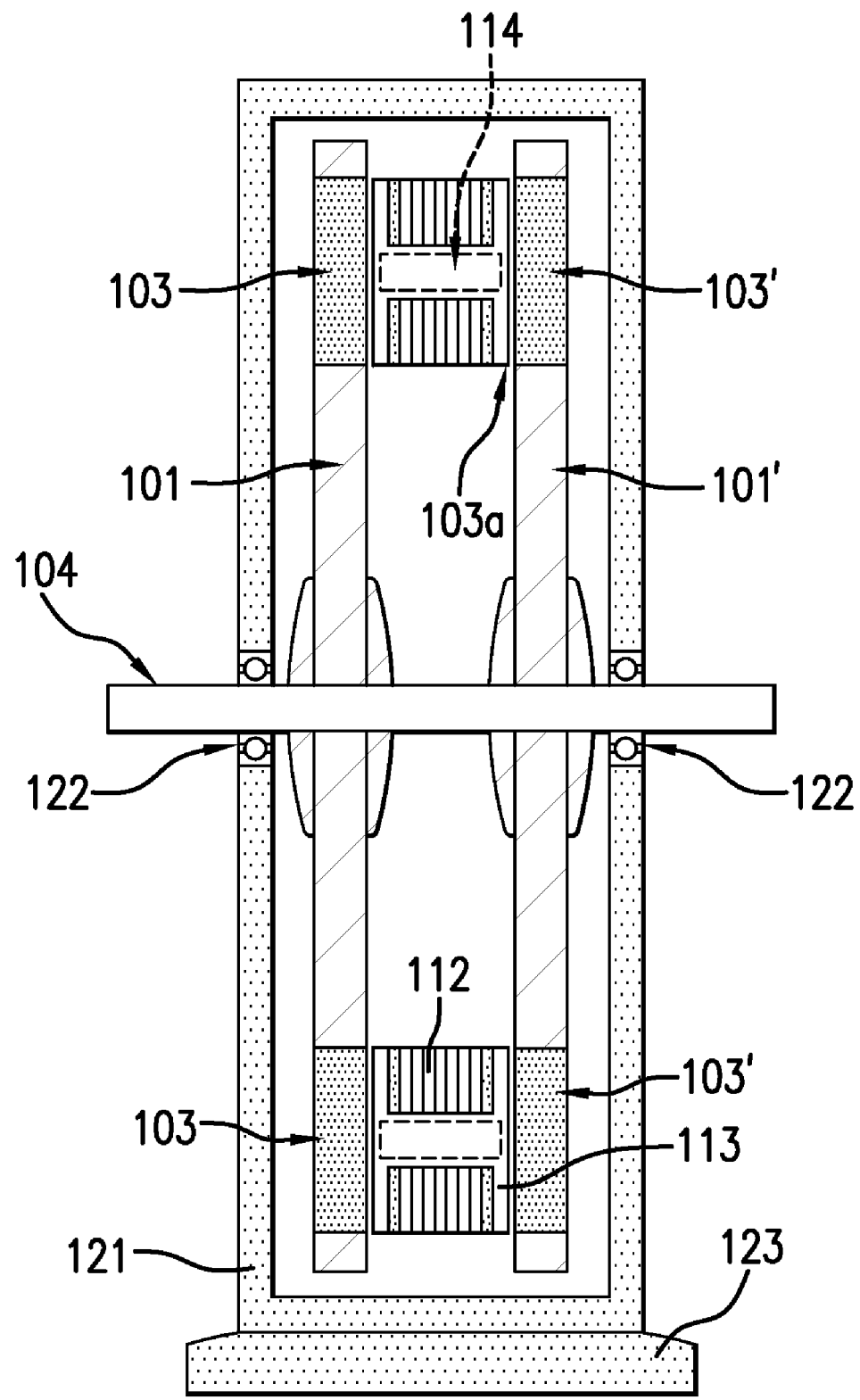
FIG. 6 illustrates an example generator in accordance with another embodiment of the present invention.

In addition, multiple rotors 101 may be provided which may be configured to attach to the shaft 104. FIG. 6 illustrates an example generator including multiple rotors, here two rotors. As illustrated, the generator may include an additional rotor 101', which may have a second set of permanent magnets 103'. The quantity of magnets 103' attached to the second rotor 101' may be the same as the quantity of the first rotor 101, and the magnets 103' may be aligned similarly.

The second rotor 101' may be turned by the same shaft 104 as the first rotor 101, and may thus maintain its orientation with respect to the first rotor 101. In addition, the second rotor 101' may be mounted on the shaft 104 such that the magnets 103' on the second rotor 101' are aligned over the magnets 103 on the first rotor 101. Further, the second rotor 101' may be mounted so that the poles of its magnets 103' are oriented identically to the corresponding magnets 103 on the first rotor 101. That is, if a magnet 103 on the first rotor 101 is aligned over a magnet 103' on the second rotor 101' the north pole of one of the magnets will face the south pole of the other magnet.

As in single rotor embodiments, multiple rotor embodiments may include stator elements 111 on one side of each rotor, both sides of each rotor, or in any possible combination. For example, as shown in the figure, a single set of stator elements 111 is provided between the two rotors 101, 101'. Such stator elements 111 may be held in place in any reasonable manner. For instance, the may be mounted to a rack, may be mounted to a housing 121 via poles or other structures, etc. The stator elements 111 may again include an air core 114 like those described above. Where, as in the figure, the stator element 111 is provided between two rotors, however, the air core 114 may not need to include a flange 115 (as in the illustration). In addition, the stator element 111 may include one or more coils arranged in any suitable manner. For instance, as illustrated, a single large coil 112 may surround the air core 114, possibly extending from a location near the first end of the air core 114 toward a location near the other end of the air core 114. In other embodiments, the stator element 111 may include two or more coils (and bobbins 113 if used), with one coil placed nearer the first rotor 101 and the second coil placed nearer the second rotor 101'. The coils on these stator elements 111 may be connected to each other, and to any other coils which may be employed, in any reasonable manner, if the induced EMF or current is properly phased.

Figure 7:
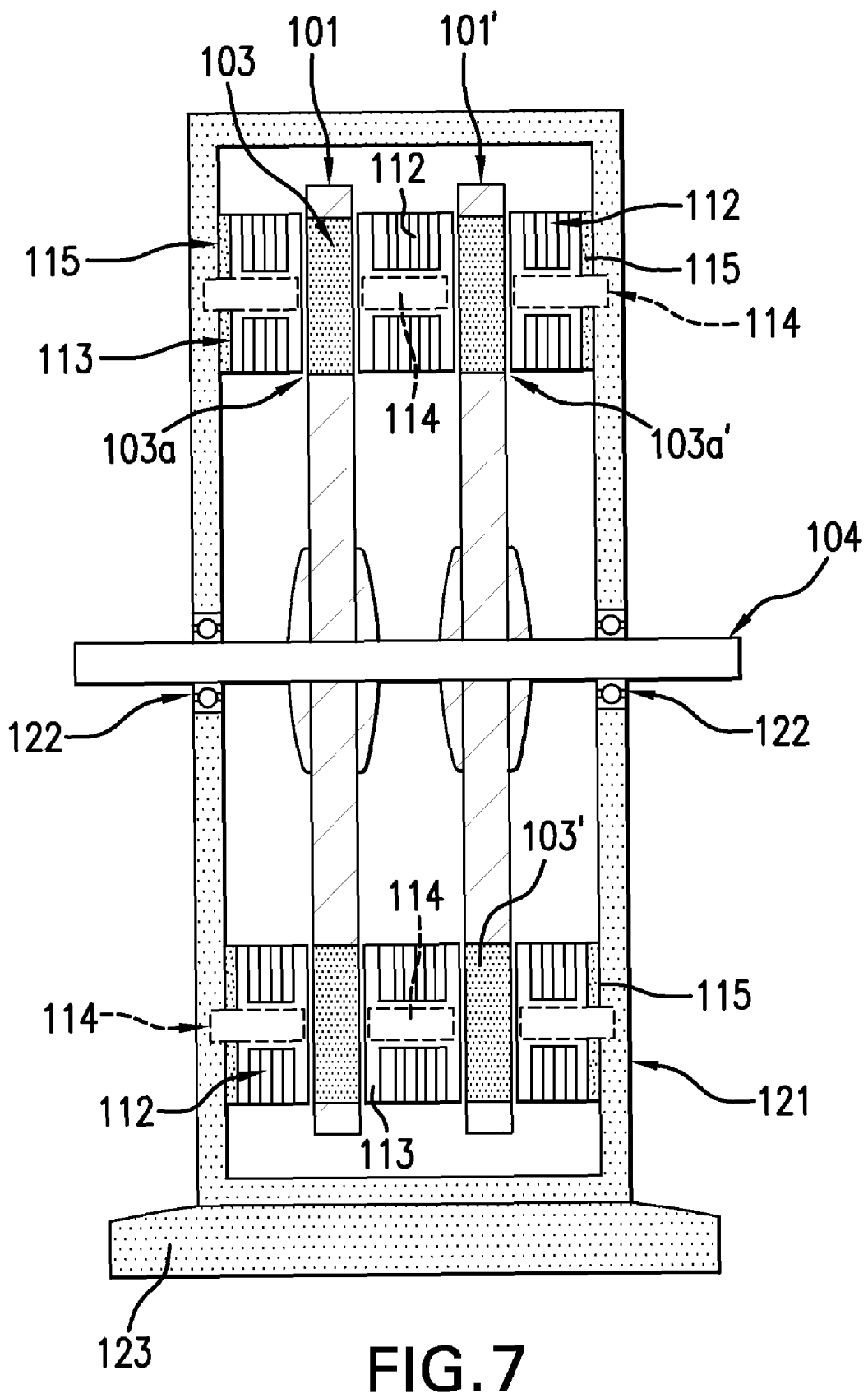
FIG. 7 illustrates an example generator in accordance with another embodiment of the present invention.

As illustrated in FIG. 7, other embodiments may include stator elements 111 located on both sides of one or more of the rotors 101, 101'. For example, the figure illustrates three sets of stator elements 111, one located between the rotors 101, 101', and two located on the other sides of each rotor 101, 101'. In such cases, the stator elements 111 need not all have the same construction. For instance, the air cores 114 used in the stator elements 111 located between the rotors 101, 101' may not include a flange 115, and may include a coil 112 extending along a substantial portion of the length of the air core 114, while the air cores 114 used in the stator elements 111 located on either end, may include a flange 115, thereby providing shielding for the assembly, and may also include a coil 112 which extends only from an end of the air core 114 located near the rotor 101, 101', to a point near the flange 115.

The number of rotors employed may be extended in a similar manner to include any number of rotors as required by the application. In addition, the coils associated with each rotor may be connected together in any properly phased combination as between themselves and the other coils. In addition, they may ultimately be connected to a single output device, or to multiple output devices as desired. By employing multiple rotors, example generators may be scaled as necessary.

Figure 8:
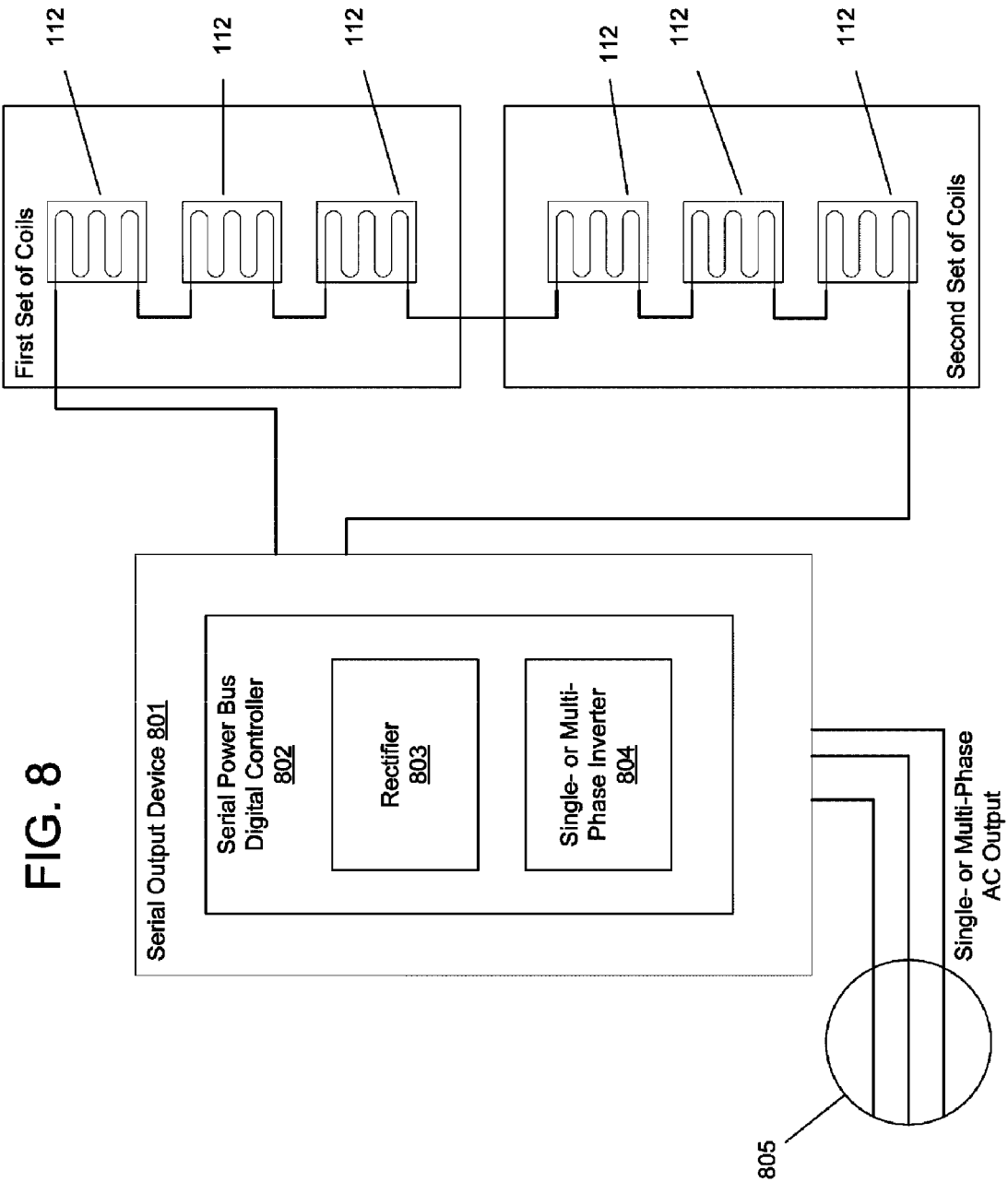
FIG. 8 illustrates a schematic diagram of an example generator in accordance with an embodiment of the present invention.
Figure 9:
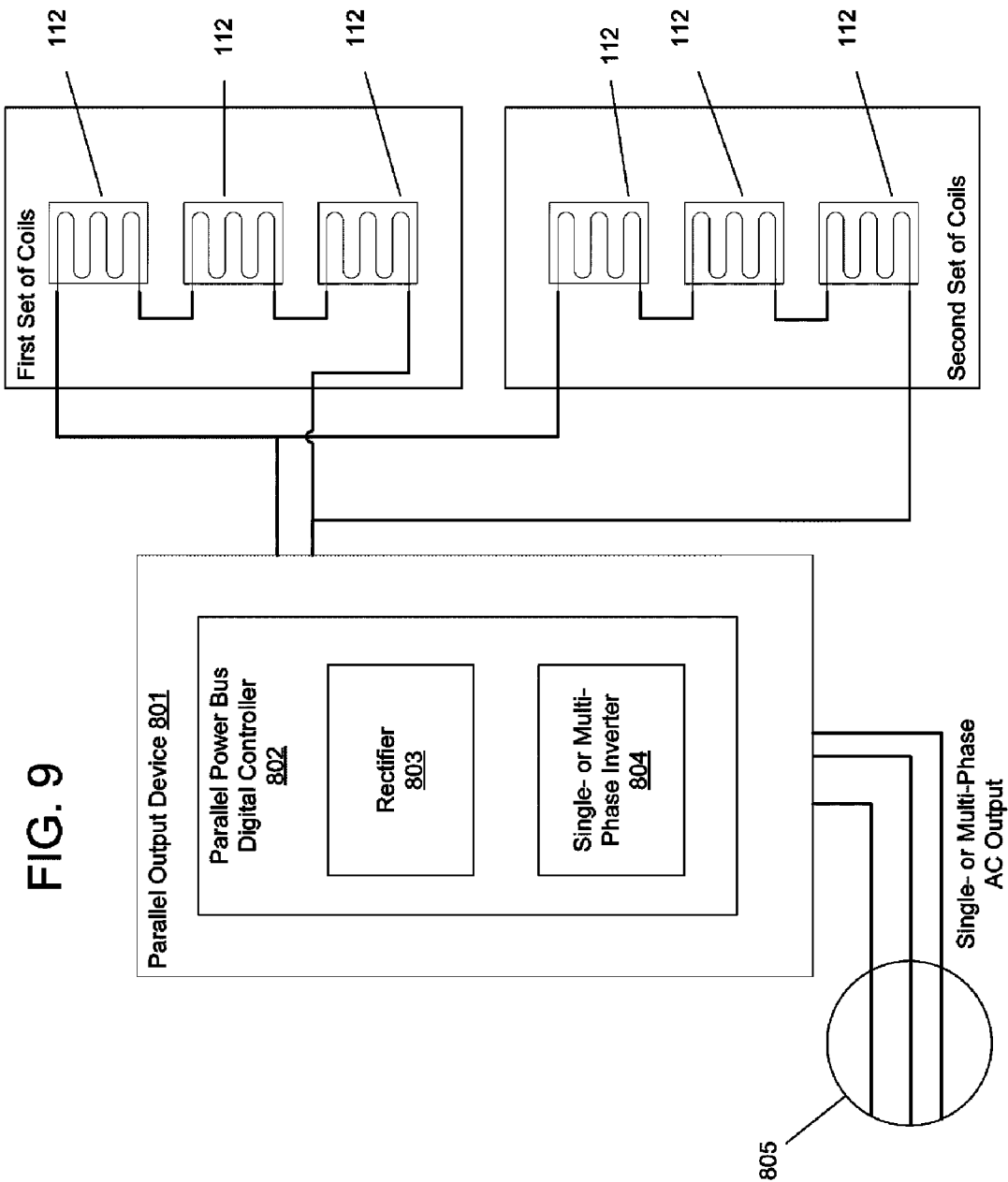
FIG. 9 illustrates a schematic diagram of an example generator in accordance with an embodiment of the present invention.

In addition, the connections between the coils of the generator may be made to create a generator with desirable electrical properties. For instance, FIGS. 8 and 9 illustrate schematic diagrams for two example generators. Both figures illustrate a generator 100 with two sets of three coils 112. For instance, the sets of coils 112 may be located on either side of a rotor 101. The division into sets, however, is made for illustration only and need not correspond with the physical placement of the coils 112.

As shown in FIG. 8 each of the coils 112 may be connected together in series. As explained above, the EMF induced in such coils 112 must be in phase with the EMF induced in each other coil 112 so connected. When connected in this manner, the amplitude of the EMF induced in each coil 112 is added to that of every other coil 112, resulting in a signal with a large amplitude. In addition, as illustrated, the sets of coils 112 may also be connected in series in the same manner and with the same result. It is noted that even in multiple rotor generators 100, the coils 112 of each rotor 101 will be capable of such connections, i.e. the EMF induced in each coil 112 will be in phase with that induced in every other coil 112, if the rotors 101 are driven at the same rate, e.g. being on the same shaft 104, and the construction of the rotors 101 and stator elements 111 is substantially symmetrical.

In other embodiments, the connections between coils 112 need not be made in the same manner. For instance, in some generators 100, all or some of the coils 112 may be connected in parallel. For instance, as shown in FIG. 9, coils 112 may be connected into sets in series, while each set may be connected to every other set in parallel. In such a way, the amplitudes of the EMFs induced in the sets are not added together when the sets are connected together; however, the connected coils will be able to provide more current than in the series configuration. Any combination of connections may be used as desired. In addition, the coils 112 may be ultimately connected to one or more output devices 801 which may condition the output of the generator 100 for use.

As mentioned above, the characteristics of the EMF induced in the coils 112 depends on multiple factors, and may vary with time. For instance, the frequency of the induced EMF is dependent on the number and configuration of magnets 103 and coils 112, the rate of rotation of the rotor 101, etc. This frequency may be higher or lower than electrical systems typically employ, e.g. 50 or 60 Hz, and may not be constant. For instance, in the case of a rotor 101 having eight magnets 103, as shown in FIG. 2, the EMF induced in a stator coil 112 would oscillate at 60 Hz if the rotor 101 were spinning at a rate of 900 RPM. If, however, the rotor 101 were spinning faster or slower, the frequency would be higher or lower. If the rate of rotation is not constant, e.g. because the shaft 104 is driven by a variable source, the frequency of the induced EMF will also vary in time, changing as the rotational speed of the rotor 101 changes. In addition, the magnitude of the induced EMF is also determined by the rotor's 101 rate of rotation, as well as the design characteristics of the generator 100, e.g., strength of the magnets 103, number of loops in the coils 112, etc., and, like the frequency, may not conform to a useful standard. Further, in some example embodiments, the structure of the generator 100 may lead to an output that is varying but not sinusoidally.

Therefore, example embodiments may also include an output device 801, designed to condition the EMF induced in the coils 112 for consumption. The coils 112 are connected to the output device 801, which may include a number of components. For example, the output device 801 can include a digital controller 802 configured to regulate the output of the generator 100. Such a digital controller 802 may conform the electrical characteristics of the EMF induced in the coils 112 to a useful standard, such as 110 V, 60 Hz, or 220 V, 50 Hz, etc.

The digital controller 802 may be of any suitable design, and may include, e.g. a processor, a memory, etc. Such a controller 802 functions to regulate the output of the generator 100, for example in the case that the shaft 104 spins the rotor 101 at a constant, albeit non-standard, rate and where the shaft rotation is variable over time. In some example embodiments, the digital controller 802 may be configured to transform the induced EMF into a form suitable for output in two primary steps. First, the digital controller 802 can rectify, e.g. using a rectifier 803, the EMF induced in the coils 112, resulting in a substantially DC signal. The digital controller 802 may also apply filters in order to achieve a DC signal waveform that is substantially constant. It is noted that, some example embodiments may provide a DC generator, which may output this form.

However, in other embodiments, the digital controller 802 may then produce an AC output from the DC signal. For example, the digital controller 802 may employ an inverter 804 to generate an AC output conforming to the standard frequency of the system in which the generator 100 output will be used. For instance, the generator 100 may produce a 120 V, 60 Hz AC output, which, in the United States, may be used to drive a standard load. The digital controller 802 may be configured to produce a constant output, that is, an output with characteristics which do not change, even if the speed of rotation of the rotor 101 changes. Thus, example embodiments need not have complicated drive transmissions which ensure that the shaft 104 is driven at a constant rate.

As illustrated, the inverter 804 may be a single- or multi-phase inverter 804. For instance, the inverter 804 may be a single-phase inverter 804 which may be designed to convert its input into a single-phase AC output, e.g. in order to provide a standard 120 V, 60 Hz output. In some embodiments, however, the inverter 804 may be a multi-phase inverter 804 capable of providing a multi-phase output. For instance, the inverter 804 may be configured to provide an output which includes three-phases. In such a case, the output conductors would not be in phase. Rather, the inverter 804 would supply three distinct outputs with similar wave forms, each of which would, however, be out of phase from the other outputs by 120°. For instance, the output device 801 may be designed to provide an output according to a typical three-phase standard, e.g. a 120/208 V or 277/480 V standard. In other example embodiments, the output device 801 may be designed to generate an output using any number of phases, as desired.

In some example embodiments, the output of the generator 100 may be configurable. For instance, the digital controller may be configured to produce multiple outputs, e.g. a 120 V, 60 Hz AC output and a 220 V, 50 or 60 Hz AC output, etc. The output device 801 may also be configured to provide a single-phase output and a multi-phase output, etc. The generator 100 may provide a user interface, which may allow a user to select the desired output, for example, a switch, a dial, an interactive display panel, etc.

The output device may be connected to one or more connectors 805 mounted on the housing 121. The connectors 805 may be of any suitable form, e.g. plugs, pins, etc., configured to allow the generator 100 to be connected to a load. In addition, the connectors 805 may be of different forms as appropriate to provide the specific output produced by the output device 801, e.g. a two prong outlet used in a 120 V, 60 Hz single-phase system, a connector suitable for a three-phase power system, etc.

In addition, example embodiments of the present invention also provide procedures for generating electrical signals using any of the example generators 100 described above. For instance, example embodiments may include a procedure for producing an electrical signal using an air core 114. In such example procedures, a changing magnetic field may be generated, for instance, using a rotor 101 and magnets 103, or using some other generation technique. The magnetic field may then be concentrated using an air core 114 of the type described herein, including one or more eddy current reducing slits. The concentrated field may induce a current in a conductor encircling the air core 114. This induced current may be conditioned, for example using an output device 801 described above, and may be provided for use.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

The invention claimed is:

1. An air core for a generator, comprising:
  a tubular air core, with high magnetic permeability and with a first and second end, the air core having a plurality of eddy current reducing slits passing from a radially outer surface of the air core to a radially inner surface of the air core; and
  a continuous coil made of conducting wire having a plurality of loops wrapped around the air core, the coil positioned between the first end and the second end of the air core.

2. The air core of claim 1, wherein the coil is positioned closer to the first end than to the second end of the air core.

3. The air core of claim 2, wherein the slits extend from the first end of the air core towards the second end, in a direction of a longitudinal axis of the air core.

4. The air core of claim 3, wherein at least one of the slits extend substantially the length of the coil.

5. The air core of claim 3, further comprising:
  a plurality of second slits passing from the outer surface of the air core to the inner surface of the air core, the second slits extending from the second end of the air core towards the first end of the air core, in the direction of the longitudinal axis of the air core.

6. The air core of claim 1, further comprising:
  a flange with high magnetic permeability extending radially outward from the air core, located between the first end and the second end of the air core.

7. The air core of claim 6, wherein a radius of the flange is at least as large as a radius of the coil.

8. The air core of claim 1, further comprising:
  a tubular bobbin;
  wherein the coil is wrapped around the bobbin; and
  wherein the air core passes longitudinally through the bobbin and the coil.

9. A generator, comprising:
  a tubular air core, with high magnetic permeability and with a first and second end, the air core having a plurality of eddy current reducing slits passing from a radially outer surface of the air core to a radially inner surface of the air core;
  a continuous coil made of conducting wire having a plurality of loops wrapped around the air core, the coil positioned between the first end and the second end of the air core;
  a rotor mounted for rotation about an axis of rotation, the rotor having a flat shaped rotor body with at least a first side normal to the axis of rotation; and
  a plurality of permanent magnets attached to the rotor, having magnetic poles oriented parallel to the axis of rotation;
  wherein the air core is positioned relative to the first side of the rotor body such that at least one permanent magnet passes adjacent to the coil when the rotor rotates.

10. The generator of claim 9, wherein the air core is positioned such that the magnetic poles of the permanent magnets are aligned substantially normal to the planes of the loops of the coil.

11. The generator of claim 9, wherein:
  the permanent magnets are arranged evenly in a ring, with each permanent magnet placed equidistant from the axis of rotation.

12. The generator of claim 11, wherein:
  the permanent magnets are arranged with alternating magnetic pole orientations.

13. The generator of claim 12, further comprising:
a plurality of air cores, each air core having a coil;
wherein the air cores are arranged evenly in a ring in a parallel non-touching relationship relative to the first side of the rotor body, the air cores each being the same distance from the axis of rotation of the rotor as the permanent magnets.

14. The generator of claim 13, wherein:
the quantity of air cores is the same as the quantity of permanent magnets.

15. The generator of claim 13, further comprising:
a plurality of second air cores, each second air core having a coil;
wherein the second air cores are arranged evenly in a ring in a parallel non-touching relationship relative to the second side of the rotor body, the air cores each being the same distance from the axis of rotation of the rotor as the permanent magnets.

16. The generator of claim 15, wherein:
the quantity of second air cores is the same as the quantity of permanent magnets.

17. The generator of claim 13 wherein:
at least two sets of the coils are connected together in series, each set having at least one coil.

18. The generator of claim 13, wherein:
at least two sets of the coils are connected together in parallel, each set having at least one coil.

19. The generator of claim 9, wherein:
the magnets are attached to the rotor body in apertures passing through the rotor body from the first side to a second side.

20. The generator of claim 13, further comprising:
a non-magnetic housing;
wherein the rotor and the air core are mounted in the housing.

21. The generator of claim 9, further comprising:
an output device connected to the coil;
wherein the output device conforms an EMF induced in the coil to a desired frequency.

22. The generator of claim 21, further comprising:
an output device connected to the coil;
wherein the output device conforms an EMF induced in the coil to a desired amplitude.

23. The generator of claim 21, wherein:
the output device includes a digital controller.

24. The generator of claim 9, further comprising:
a second rotor mounted for rotation about the axis of rotation of the rotor and including a plurality of second permanent magnets.

25. The generator of claim 9, further comprising:
an output device connected to the coil;
wherein the output device produces a single-phase output from the EMF induced in the coil.

26. The generator of claim 9, further comprising:
an output device connected to the coil;
wherein the output device produces a multi-phase output from the EMF induced in the coil.

27. A generator, comprising:
concentration means for concentrating a magnetic field having a hollow core and at least one eddy current reducing slit passing from an outer surface to an inner surface;
conduction means for receiving an induced electromotive force encircling the concentration means;
rotation means mounted for rotation about an axis of rotation; and
a plurality of field generation means for creating a magnetic field attached to the rotation means;
wherein the concentration means is positioned relative to the rotation means such that at least one field generation means passes adjacent to the conduction means when the rotation means rotates around the axis of rotation.

* * * * *